Patented July 17, 1934

1,966,806

UNITED STATES PATENT OFFICE 1,966,806

METHOD OF PRODUCING SMOKELESS POWDER

Harold M. Spurlin, Kenvil, N. J., assignor to Hercules Powder Company, Wilmington, Del., a corporation of Delaware No Drawing. Application September 17, 1929, Serial No. 393,319

2 Claims. (Cl. 52—22)

My invention relates to an improvement in smokeless powder, and more particularly to the smokeless powder known as "bulk powder", which is so produced as to occupy the same volume as an equivalent charge of black powder and therefore can be measured by the same measuring devices as black powder.

In the manufacture of bulk powder heretofore, it has been customary, for example, to mix barium nitrate with a relatively small amount of aurine in the presence of a small amount of water. After preliminary mixing, nitrocotton containing about 38% of moisture is added and the mixing continued for a further period, after which paraffin oil and a quantity of agar-agar, previously gelled by treating in hot water, are added and the mixing continued. When proper mixture is obtained, the mixture is forced through a screen for the formation of grains and rotated in a glaze barrel suitably heated for a period in order to smooth out the grains, which, as they come from the screen, are quite rough. The powder is then screened through an 8 mesh shaker screen to remove coarse grains which may be reworked. The screened powder is then placed in canvas trays and dried in a dry house at suitable temperature. The dry powder is screened, and that passing a 12 mesh and retained by a 30 mesh screen is placed in a hardening drum with a hardening solvent consisting, for example, of a mixture of benzol and acetone. The hardening drum is rotated in boiling water for a period of time, during which excess solvent is evaporated. From the hardening drum the powder is removed to a dry house and dried to a total volatile content of 1½%. The dry powder is screened to remove dust and lumps, after which it is ready for use.

The bulk powder heretofore produced possesses a number of disadvantages, among which are that it is of high hygroscopicity, the grains are relatively soft, which results in dusting during handling and loading, and of high price due to the nature of the manufacturing operations.

Now, in accordance with my invention, I provide a method for the production of bulk powder, which may be readily and inexpensively carried out with the production of a powder of superior quality and characteristics in that it will be clean burning, will have a relatively hard uniform grain, will have good flowing properties, good pressure-velocity relation, will not have undesirable hygroscopicity, and may be given a desirable burning rate through control in production.

In accordance with my invention from a broad standpoint, I produce a bulk powder through the precipitation of nitrocellulose from a solution in a solvent therefor. More particularly, I effect the precipitation of nitrocellulose from a solution by the use of water.

In the practical adaptation of my invention, nitrocellulose, which may be freshly prepared or which may be provided by cannon powder scrap, scrap nitrocotton, or low viscosity nitrocotton, is dissolved in a solvent, or solvent mixture, expressed through a screen or die to form strands, which, if desired, may be severed to form grains, and the nitrocellulose then precipitated from the solution. Desirably, the solvent used for forming the nitrocellulose solution will be such as may be soluble in water, as, for example, acetone, methyl cellosolve, ethyl cellosolve, methyl alcohol, cyclohexanone, diacetone alcohol, ethyl methyl ketone, diethyl ketone, furfural, ethyl lactate, or the like, which may be diluted with alcohol or the like, or a solvent mixture one of the effective components of which is soluble in water, as, for example, ether-alcohol. After the solution of nitrocellulose in the solvent selected is prepared, the solution may be formed into strands, for example, by expressing through a screen, and the strands severed to form grains. The strands or grains are then immersed in water, which acts to dissolve out from the solution the solvent or effect precipitation of the nitrocellulose. The precipitated nitrocellulose is then removed from the water, air-dried, glazed if desired, and screened, after which it is ready for use.

In the practical adaptation of my invention, a bulk powder may be produced by forming a solution of soluble nitrocellulose, either freshly prepared, or as afforded by cannon powder scrap or otherwise, and admixing with the solution a nitrocellulose insoluble in the solvent used; and/or nitroglycerin, T. N. T., D. N. T., nitroglycol, nitrostarch or other organic explosive body insoluble in water; and/or any oxidizing salt insoluble in water such as iron oxide, lead peroxide, red lead, litharge, lead chromate, lead sulphate, barium sulphate or the like, and/or a deterrent, as diethyl phthalate, ethyl abietate, or the like.

In the practical adaptation of my invention, it will be noted that the temperature of the water used for dissolving out the solvent from the nitrocellulose, or precipitating the nitrocellulose, will determine the rate of burning of the powder in actual use. The hotter the water used, the faster will the powder burn. Further, it will be noted that the warmer the water or the longer the powder is exposed to the water, the more brittle will be the strands or grains of powder. The water, however, should not be above the boiling point of the solvent used, for example, 55° C. in case of acetone, since it will be noted that proceeding in accordance with my invention involves elimination of the solvent from the nitrocellulose by dissolving it out, or precipitating the nitrocellulose therefrom.

As a more specific illustration of the practical adaptation of my invention, for example, 120 parts of cannon powder scrap, 40 parts of high nitrated nitrocotton, 125 parts of alcohol and 75 parts of acetone are mixed for (say) about thirty minutes. The mixture is then formed into strands by pressing through an .065 inch die under pressure of (say) about 200 pounds per square inch, into a body of water, desirably at a temperature of about 45° C., in which the strands are permitted to remain until through loss of solvent to the water they are sufficiently hard to permit cutting to form grains. The strands so produced are then cut with a suitable knife to form grains, which as formed are passed directly into a body of water at a temperature of about 45° C. and permitted to remain therein for a period of about 24 hours, after which the grains are removed from the water, air-dried, glazed if desired, and screened.

In the practical adaptation of my invention, if desired, an oxidizing substance and deterrent, etc., may be admixed with the powder before removing the solvent with water. Where it is desired to add to the powder an oxidizing substance which is soluble in water, such may be effected by subjecting the powder, after "water drying", or removing the solvent by water, and before air-drying, to a solution of the oxidizing salt in water, or, if desired, the powder may be "water-dried" in a solution of an oxidizing salt.

The bulk powder produced in accordance with my invention will, as has been indicated, be found to be superior to bulk powders heretofore produced, more particularly in that it will be clean burning, have good flowing properties, good pressure-velocity relation, hard uniform grains, and will not have undesirable hygroscopicity.

It will be appreciated that in carrying out the method in accordance with my invention no particular form of apparatus is required, and further that in carrying out the method the solvent removed from the powder may be readily recovered from the water by distillation.

Having now fully described my invention, what I claim and desire to protect by Letters Patent is:

1. The method of producing bulk powder which includes dissolving nitrocellulose in a solvent, adding nitroglycerin to the solution, and effecting precipitation of the dissolved nitrocellulose with water.

2. The method of producing bulk powder which includes dissolving nitrocellulose in a solvent and effecting precipitation of the dissolved nitrocellulose with water containing an oxidizing salt in solution.

HAROLD M. SPURLIN.